United States Patent
Kallas et al.

(10) Patent No.: US 9,970,591 B2
(45) Date of Patent: May 15, 2018

(54) QUICK RELEASE CONNECTOR

(71) Applicant: ACCESS PRODUCTS GROUP LLC, Kingston, WA (US)

(72) Inventors: Ryan Kallas, Bainbridge Island, WA (US); J. Hershel Blankenship, Bainbridge Island, WA (US)

(73) Assignee: MUSIC EXPRESS, LLC, Kingston, WA (US)

( * ) Notice: Subject to any disclaimer, the term of this patent is extended or adjusted under 35 U.S.C. 154(b) by 303 days.

(21) Appl. No.: 14/431,587

(22) PCT Filed: Sep. 26, 2012

(86) PCT No.: PCT/US2012/000416
§ 371 (c)(1),
(2) Date: Mar. 26, 2015

(87) PCT Pub. No.: WO2014/051534
PCT Pub. Date: Apr. 3, 2014

(65) Prior Publication Data
US 2015/0233522 A1    Aug. 20, 2015

(51) Int. Cl.
B23B 31/12 (2006.01)
F16M 11/20 (2006.01)
F16M 11/38 (2006.01)

(52) U.S. Cl.
CPC ......... F16M 11/2021 (2013.01); F16M 11/38 (2013.01); Y10T 403/592 (2015.01)

(58) Field of Classification Search
CPC ... B65F 1/1415; F16M 11/38; F16M 11/2021; Y10T 403/592; B23B 31/107

USPC ................. 403/322.2, 325; 279/82
See application file for complete search history.

(56) References Cited

U.S. PATENT DOCUMENTS

| | | | |
|---|---|---|---|
| 4,317,552 A | 3/1982 | Weidler | |
| 5,213,296 A | 5/1993 | Lee et al. | |
| 6,561,523 B1 | 5/2003 | Wienhold | |
| D717,267 S | 9/2014 | Kallas et al. | |
| 2008/0246233 A1 | 10/2008 | Weinhold | |
| 2009/0297260 A1 | 12/2009 | Doll et al. | |
| 2011/0215538 A1* | 9/2011 | Cornwell | B23B 31/107 279/82 |
| 2014/0234015 A1 | 8/2014 | Kallas et al. | |
| 2017/0100779 A1* | 4/2017 | Homola | B23B 31/1071 |
| 2017/0246693 A1* | 8/2017 | Rinner | B23B 31/107 |

FOREIGN PATENT DOCUMENTS

| | | | |
|---|---|---|---|
| EP | 2527092 A3 * | 3/2017 | ......... B25B 23/0035 |
| GB | 190908248 | 0/1910 | |

OTHER PUBLICATIONS

Supplementary Partial European Search Report; European Patent Office, dated Oct. 6, 2016; EP 12885523.

* cited by examiner

*Primary Examiner* — Gwendolyn W Baxter
(74) *Attorney, Agent, or Firm* — J. Bennett Mullinax, LLC

(57) ABSTRACT

A quick release connector is provided that uses a plurality of the ball bearings to engage shaft of a releasable member. The use of multiple ball bearings along different faces of a shaft of a releasable member minimizes vibrations and provides an improved quick release connector adapted for use with microphones, boom arms, ball joints and similar structures used with sound recording or photography equipment.

17 Claims, 14 Drawing Sheets

US 9,970,591 B2

1

QUICK RELEASE CONNECTOR

FIELD OF THE INVENTION

The present invention relates generally to a quick release connector capable of allowing a first component to be attached to and released from a second component. More particularly, the present application involves a quick release connector that can be incorporated into a microphone stand, a boom arm, or a ball head to allow a microphone to be quickly and easily removed and attached. When attached, vibration on the microphone is minimized and a smooth connect/disconnect mechanism minimizes unwanted noise and feedback during the attachment and release steps.

BACKGROUND

During musical performances, there is frequently a need to adjust or swap out microphones. This can occur as a result of a malfunctioning microphone or between musical sets a need exists to change the type or location of a microphone. Heretofore conventional any methods of swamping out microphones were time consuming and/or resulted in undesired noise during the microphone switch. In addition, many conventional microphones holders do not provide a sufficient vibration free connection. As a result, vibrations of the microphone can occur during a performance which leads to a loss of sound quality and the transmittal of vibrations and undesired acoustical feedback or undesired background noise. As such, there remains room for variation and improvement within the art.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended Figures in which.

2

Figure 12:
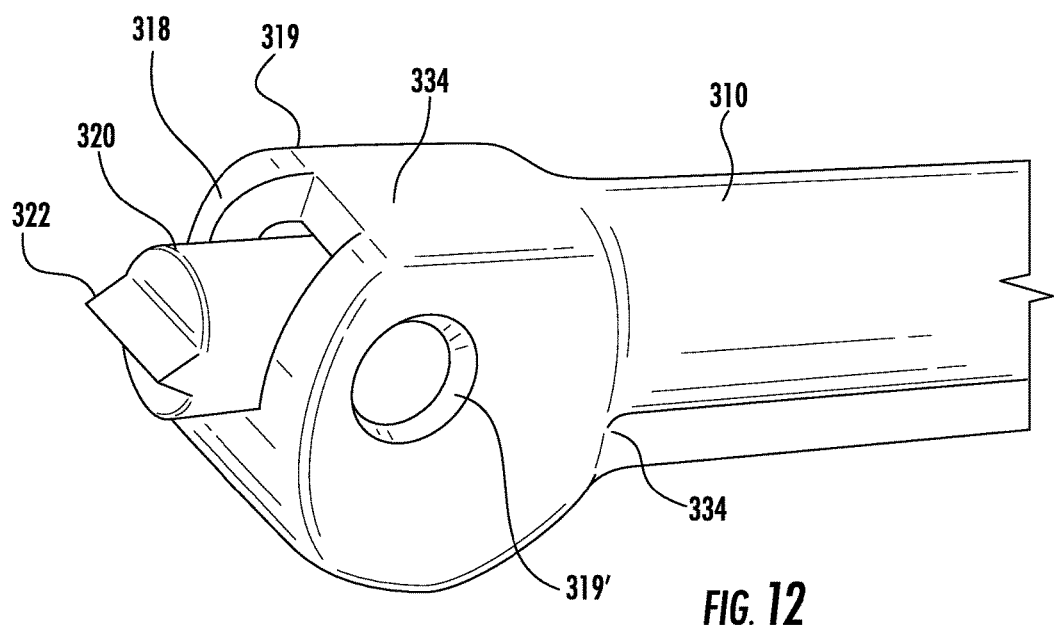

FIG. 12 is a perspective view of a leg housing showing component parts partially disassembled.

Figure 13:
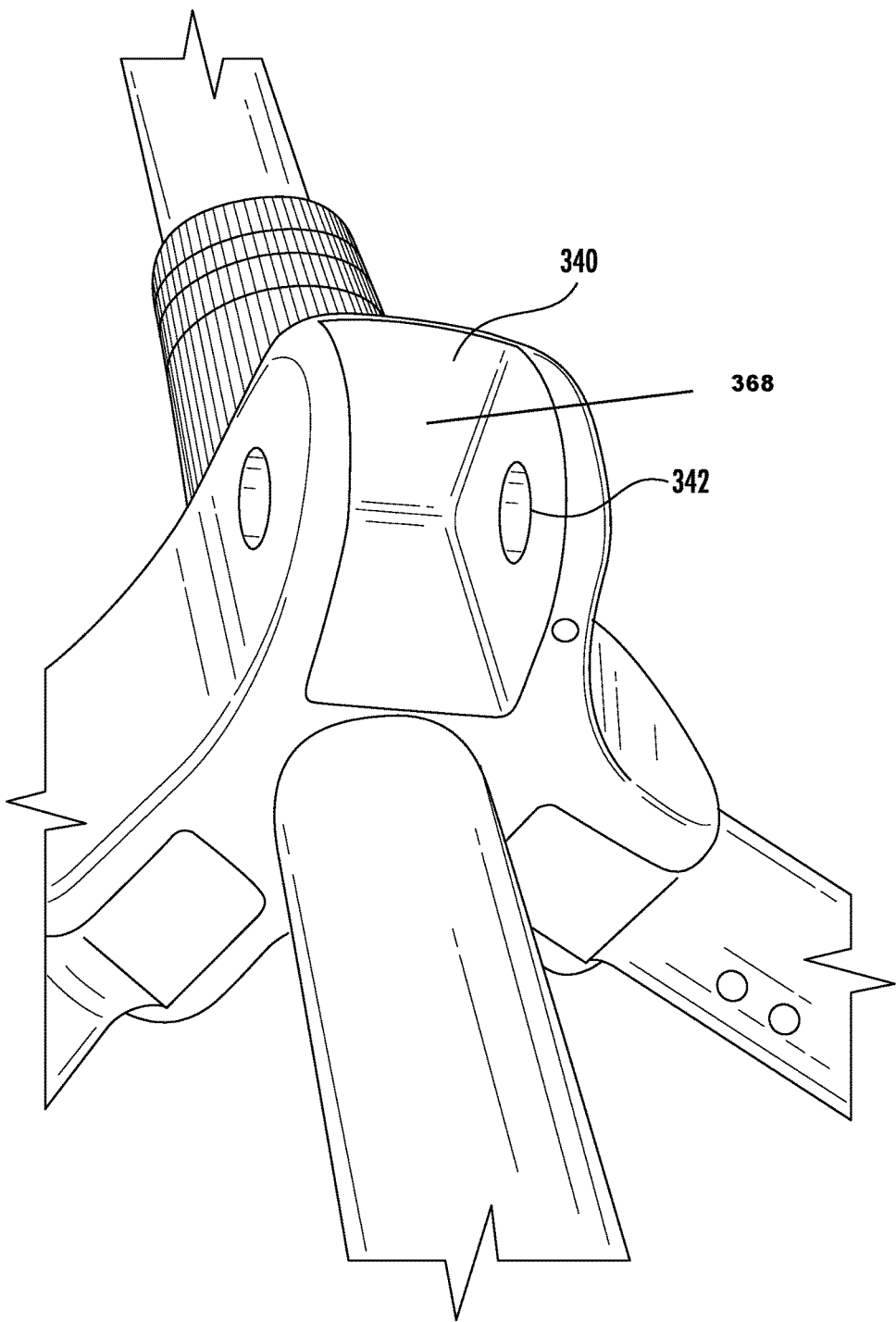

FIG. 13 is a perspective view of a base housing defined within the music stand.

Figure 14:
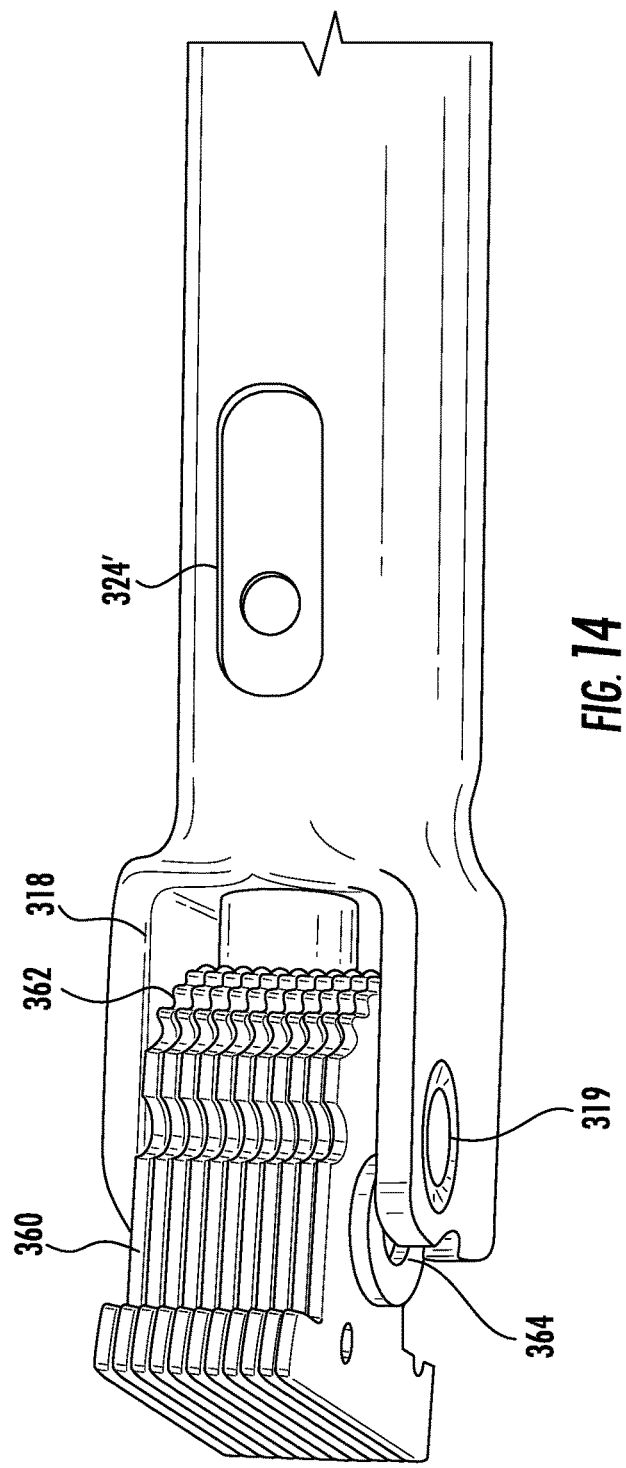

FIG. 14 is a bottom perspective view of a pawl, ratchet, rod, and leg shown in relative positions and in a partially exploded view.

Figure 15:
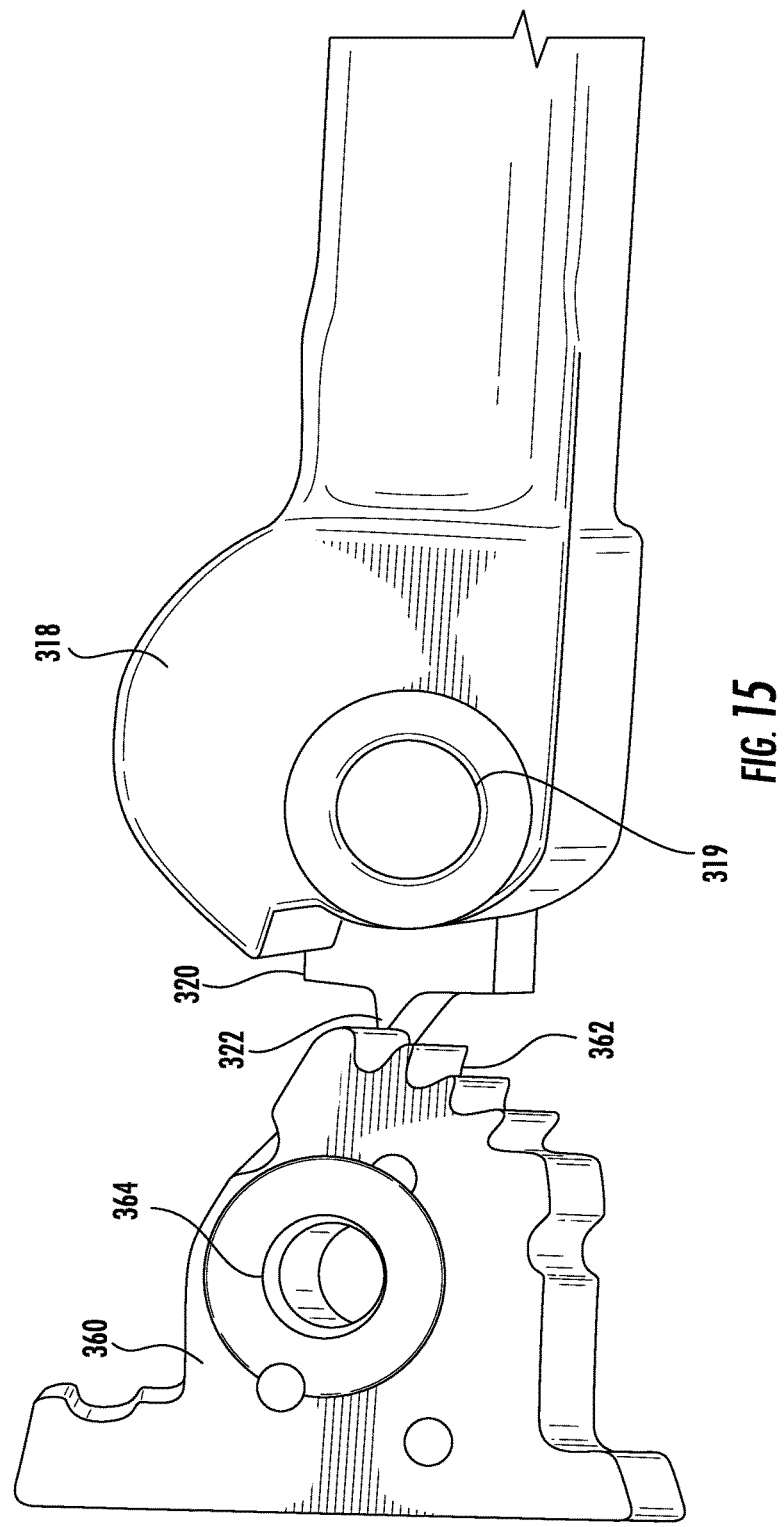

FIG. 15 are side views of the ratchet and pawl assembly, the pawl partially secured within the leg.

Figure 16:
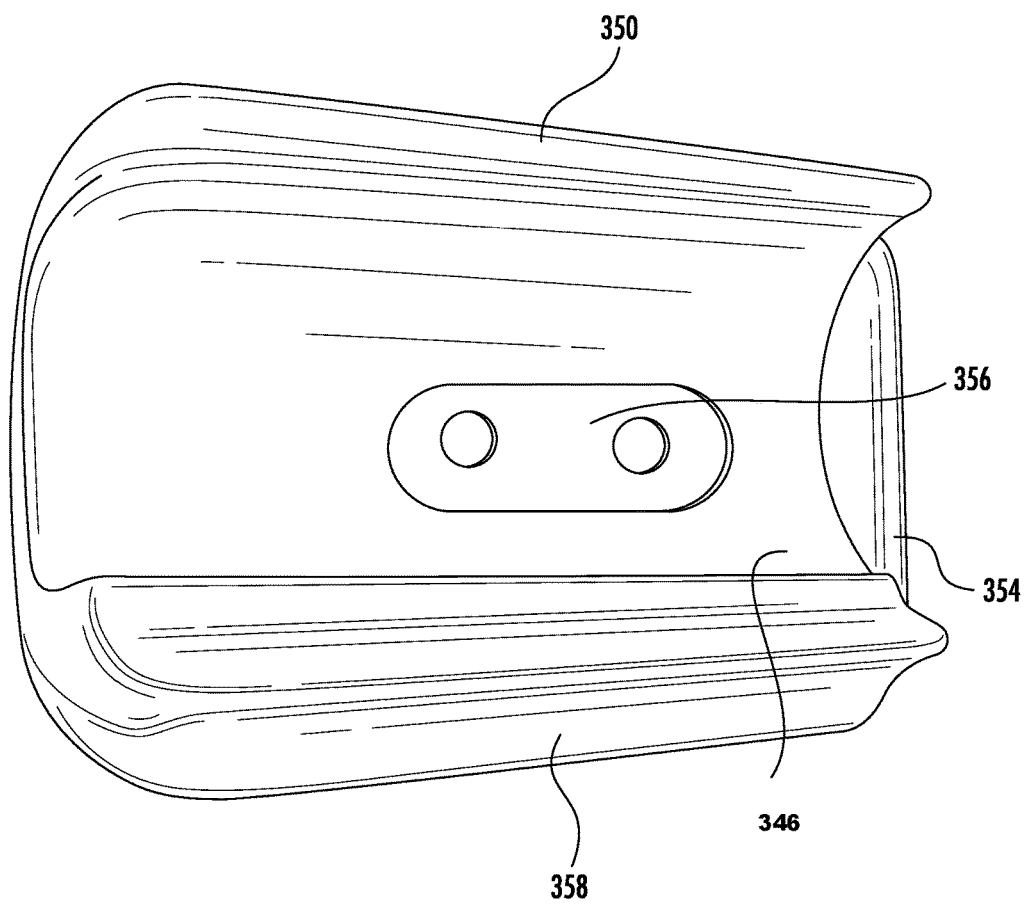

FIG. 16 is a bottom view of a release tab.

Repeat use of reference characters in the present specification and drawings is intended to represent the same or analogous features or elements of the invention.

DETAILED DESCRIPTION OF REPRESENTATIVE EMBODIMENTS

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

It is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to 7 also includes a limit of up to 5, up to 3, and up to 4.5.

Figure 1:
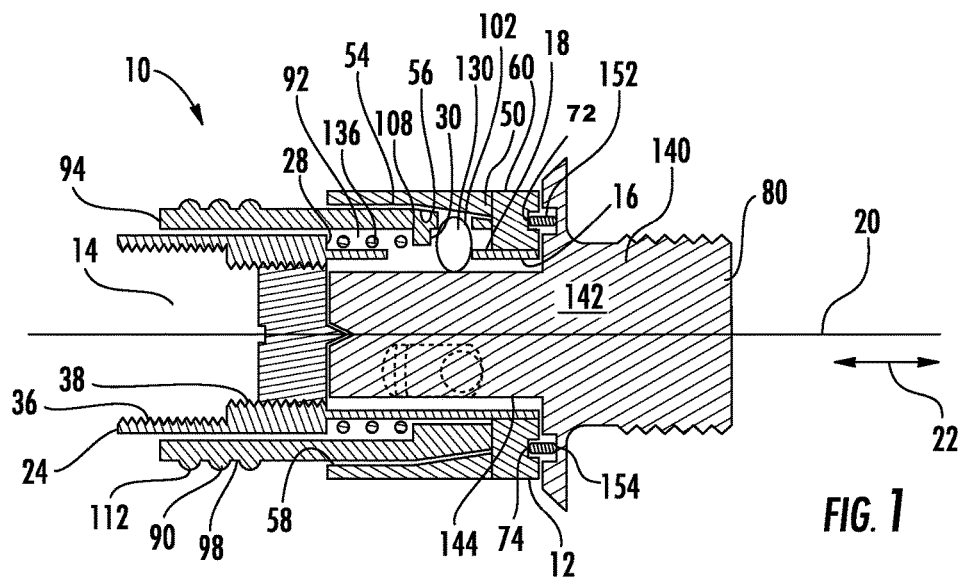
FIG. 1 is a cross-sectional view through a quick release connector according to the embodiment of the present invention.
Figure 2:
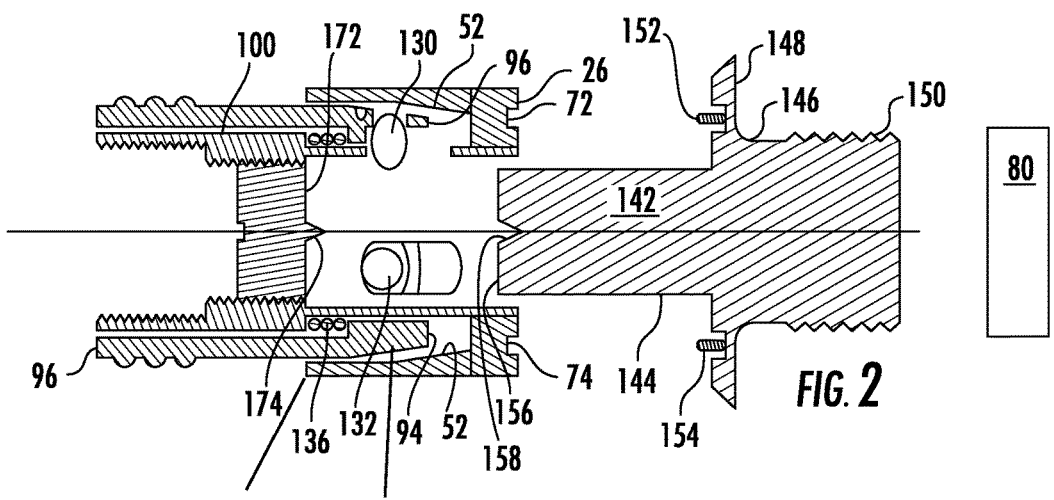
FIG. 2 is a cross-sectional view similar to FIG. 1 showing the quick release connector partially separated into two main component parts.

The present invention provides for a quick release connector 10 as shown in an engaged orientation (FIG. 1) and a disengaged orientation (FIG. 2.). The connector 10 is similar in materials and construction of various quick release connectors such as those set forth in U.S. Pat. No. 6,561,523 in which is incorporated herein by reference. The present invention is also useful for providing a quick release connector mechanism for a variety of adjustable joint microphones and holders including those set forth in provisional application No. 61/626,401 and in US Design application entitled Holder for Music Accessories filed Sep. 26, 2012 having number 29/421,803 and Express Mail Label EM 545861043 US and which are both incorporated herein by reference. As seen in the above referenced applications, the base of any number of ball head structures and various holders set forth herein can be adapted so as to be carried by a releasable member such that the various holders and ball head structures can be rapidly installed and moved on a variety of stands, tripods, boom arms and various holders for microphones, cameras and related equipment.

One disadvantage of the prior art is that conventional quick release connectors are not suitable for microphone and sound amplified equipment. Conventional quick release mechanisms employ a circumferential groove defined by a shaft which is releaseably engaged by ball bearings carried within a receiving member and adapted to engage the groove of the shaft. In accordance with the present invention, it has been found that an improved vibration resistant connector can be provided by having a plurality of ball bearings which engage a smooth, non-grooved shaft. This allows for a precise press fit connection between a receiving member 12 and a releasable member 140 which can provide in excess of 2,000 pounds of support between the connector pieces. In addition to use with microphones and sound equipment, the quick release adaptor is also useful for securing cameras to tripods and other structures where the transmittal of vibration from the tripod to the camera needs to be minimized. As such, the quick release connector can be used to attach a camera to a tripod or other support structures used to attach a mounting plate or camera to a camera tripod head.

Figure 3:
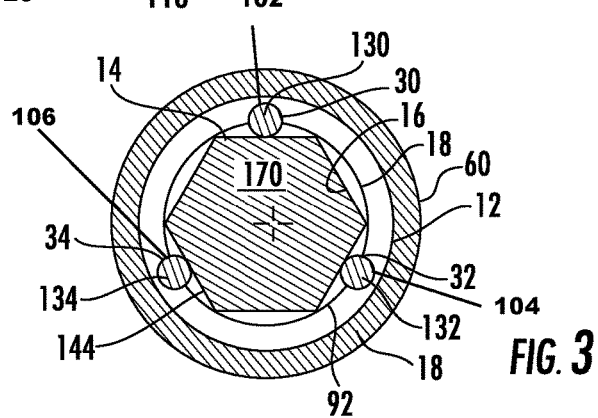
FIG. 3 is a radial sectional view through a quick release receiving member showing the relationship of the engagement ball bearings relative to a bore of the receiving member diagonal shaft.
Figure 4:
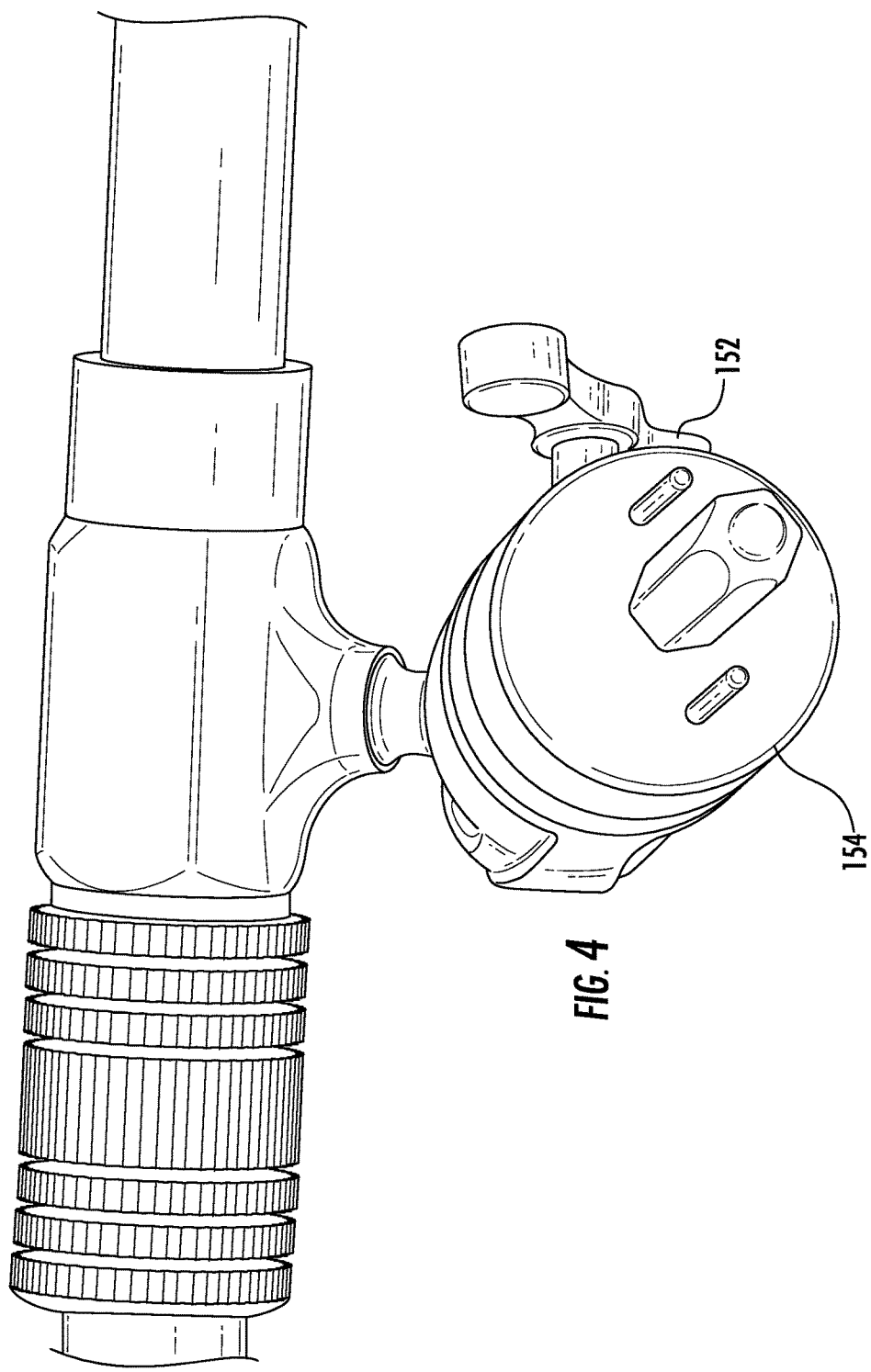
FIG. 4 is a perspective view of a releasable member having rotational alignment members adjacent the hexagonal shaft, the release member further supporting a tension adjustable ball joint.

The present invention requires only a minimal lateral displacement of associated ball bearings relative to a receiving member 12 of a connector 10. This arrangement allows higher tolerances to exist between the compressive forces of the ball bearings which are used to secure a shaft of a releasable member. The applied force of the ball bearings, relative to the shaft is supplied from multiple directions. Accordingly, it has been found that such arrangement using a plurality of ball bearings minimizes vibration which may otherwise be transmitted along the quick release connector. As such, the reduction of vibrations improves the acoustic quality of any microphones that may be supported directly or indirectly via the quick release connector. As best seen in reference to FIG. 3, a plurality of ball bearings such as ball bearings 130, 132, and 134 can engage the flat planar surfaces of an adjacent hexagonal shaft. Optionally, one or more of the overlapping surfaces of the interengaged parts can further define a combination of apertures and pins which will mate together to prevent rotation. Prevention of rotation between the two portions of the releasable connectors 10 serves to minimize any slight vibration that might otherwise occur and therefore provide a more acoustically clean sound from the microphone.

As seen in reference to FIGS. 1-5, a quick release connector 10 is provided that has a receiving member 12 that has a bore 14 that is a through bore that extends in a longitudinal direction 22 from a first terminal end 24 of the receiving member 12 to a second terminal end 26 of the receiving member, wherein a slot 30 extends in the longitudinal direction and is defined through a portion of the receiving member 12 from an exterior surface 18 of the receiving member to the bore 14 of the receiving member, wherein the receiving member has a step 28 on the exterior surface 18.

The engagement member 50 is attached to the receiving member 12 such that the engagement member 50 and the receiving member 12 do not move relative to one another, wherein the engagement member 50 has an inner surface 52 that has an inclined portion 56. A slide member 90 moves in the longitudinal direction relative to the receiving member 12 and the engagement member 50. The slide member 90 has a bore 92 that is a through bore that extends in the longitudinal direction from a first terminal end 94 of the slide member 90 to a second terminal end 96 of the slide member 90. An aperture 102 is defined through a portion of the slide member 90 from an exterior surface 98 of the slide member to the bore of the slide member and wherein the slide member further has a step 108 on an interior surface 100 of the slide member.

A ball 130 is located in both the slot 30 and the aperture 102, such that the ball 130 engages the inclined portion 56 of the engagement member 50. A spring 136 engages the step 108 of the receiving member 12 and the step 108 of the slide member 90. As seen in the Figures, a releasable member 140 has a shaft 142 that is at least partially located within the bore 14 of the receiving member 12 when the shaft 142 is attached to the receiving member 12. The shaft 142 is also attached to the receiving member 12 when the ball 130 engages the shaft 142. Shaft 142 can be of any number of shapes including circular so long as the bore 14 of the receiving member 12 can accommodate the shaft and do so in a way which the ball bearing 130 and 132.

The bore 14 of the receiving member 12 from the second terminal end 26 of the receiving member 12 to a location between the first and second terminal ends (24, 26) of the receiving member 12 in the longitudinal direction 22 may have a hexagonal cross-sectional shape, wherein the shaft 142 of the releasable member 140 has a hexagonal cross-sectional shape such that six planar surfaces 144 make up an exterior surface 146 of the shaft 142, wherein the six planar surfaces 144 of the shaft 142 are all flat and lack depressions thereon.

A pin 170 may be optionally located within the receiving member 12, having a wobble projection 174 located at a terminal end 172 of the pin 170. The longitudinal axis 20 of the receiving member 12 extends through the wobble projection 174, and the shaft 142 of the releasable member 140 has a terminal end 156, and defines a wobble projection aperture 158, wherein the wobble projection 174 is located in the wobble projection aperture 158 when the shaft is attached to the receiving member. The engagement of the projection 174 and aperture 158 can help eliminate unwanted vibration by the seating of the two component parts.

The releasable member 140 has a flange 148 that defines a plurality of rotational alignment member receiving members 152 and 154, wherein the plurality of rotational alignment member receiving apertures 152 and 154 each engage one of a plurality of rotational alignment apertures 72 and 74 when the shaft 142 is attached to the receiving member 12, and wherein the releasable member 140 has external threading 150 that engages a first component of a microphone stand, a boom arm, a microphone, a camera, a tripod, or a similar component.

The quick release connector receiving member has a second slot 32 and a third slot 34 that each extend in the longitudinal direction and are defined through the portion of the receiving member from the exterior surface of the receiving member to the bore of the receiving member, wherein the first slot 30, the second slot 32, and the third slot 34 are located at different degrees about the longitudinal axis. The receiving member has internal threading 36 that engages a second component such as a microphone, a stand, a boom arm, a camera, a tripod, or similar component.

The slide member 90 may have a second aperture 104 and a third aperture 106 that are each defined through the portion of the slide member 90 from the exterior surface of the slide member to the bore of the slide member, wherein the first aperture 102, the second aperture 104, and the third aperture 106 are located at different degrees about the longitudinal axis.

Further, a second ball 132 is located in both the second slot 32 and the second aperture 104, wherein the second ball 132 engages the inclined portion 56 of the engagement member 50. A third ball 134 is located in both the third slot 34 and the third aperture 106, wherein the third ball 134 engages the inclined portion 56 of the engagement member 50 such that when the shaft 142 is attached to the receiving member 12, the second ball 132 and the third ball 134 engage the shaft.

The portion of the slide member which is tapered directly faces the inclined portion of the inner surface of the engagement member. Further, the slide member has a gripping element 112 on an exterior surface of the slide member.

One variation of the quick release connector may comprise a receiving member 12 that has a longitudinal axis 20, wherein the receiving member 12 has a bore 14 that extends in a longitudinal direction, and the receiving member has a slot 30 that extends in the longitudinal direction and is defined through a portion of the receiving member 12 from an exterior surface of the receiving member to the bore 14 of the receiving member 12.

The slide member 90 may move relative to the receiving member 12 in the longitudinal direction between an attached position and a detached position. The ball 130 has at least a portion of the ball located in the bore 14 of the receiving member and in the slot 30 of the receiving member 12 when the slide member 90 is in the attached position. When the slide member 90 is in the detached position no portion of the ball 130 is located in the bore 14 of the receiving member 12. The releasable member 140 is at least partially located in the bore 14 of the receiving member 12 and is engaged by the ball 130 when the slide member 90 is in the attached position, wherein when the slide member 90 is in the detached position the releasable member 140 is removable from the bore 14 of the receiving member 12.

The slide member 90 has a bore 92 that extends in the longitudinal direction, wherein the slide member 90 has an aperture 102 that is defined through a portion of the slide member from an exterior surface 98 of the slide member to the bore 92 of the slide member 90, wherein a portion of the ball 130 is located in the aperture 102 when the slide member is in the attached position. The connector comprises an engagement member 50 that does not move relative to the receiving member 12, wherein the engagement member 50 has an inner surface 52 that has an inclined portion 56, wherein the ball 130 engages the inclined portion 56 of the inner surface 52 of the engagement member 50 when the slide member is in the attached position, and wherein the ball 130 does not engage the inclined portion 56 of the inner surface 52 of the engagement member 50 when the slide member is in the detached position.

The slide member has a portion that is a tapered portion 110 and directly faces the inclined portion 56 of the inner surface 52 of the engagement member 50. The slide member further defines a gripping element 112 on an exterior surface of the slide member. The slide member has a step 108 on an interior surface of the slide member and the receiving member has a step 25 on the exterior surface of the receiving member. A spring 136 engages the step 28 of the receiving member and that engages the step 108 of the slide member, such that when the spring is biased, the biasing force of the spring urges the slide member to the attached position.

The releasable member has a flange that defines two rotational alignment members wherein the two rotational alignment members each engage one of the two rotational alignment member apertures when the releasable member is at least partially located in the bore of the receiving member and is engaged by the ball when the slide member is in the attached position. The releasable member has external threading 150 that engages a first component, such as a microphone, and wherein the receiving member has internal threading 36 that engages a second component such as microphone stand, tripod, boom arm or the like.

The quick release connector may have a releasable member 140 having a flange that defines two rotational alignment members 152, 154, wherein the two rotational alignment members each engage one of the two rotational alignment apertures 72, 74 when the portion of the releasable member 140 is in the bore 54 of the engagement member 50. When the slide member 90 is in the attached position, the location of the releasable member relative to the engagement member is fixed. While the arrangement of the rotational alignment members and the rotational alignment apertures is described in a preferred embodiment, it is understood and appreciated that an alternative arrangement can include having the flange defining the alignment apertures and the corresponding alignment members project from a corresponding surface of the engagement member 50.

Figure 5:
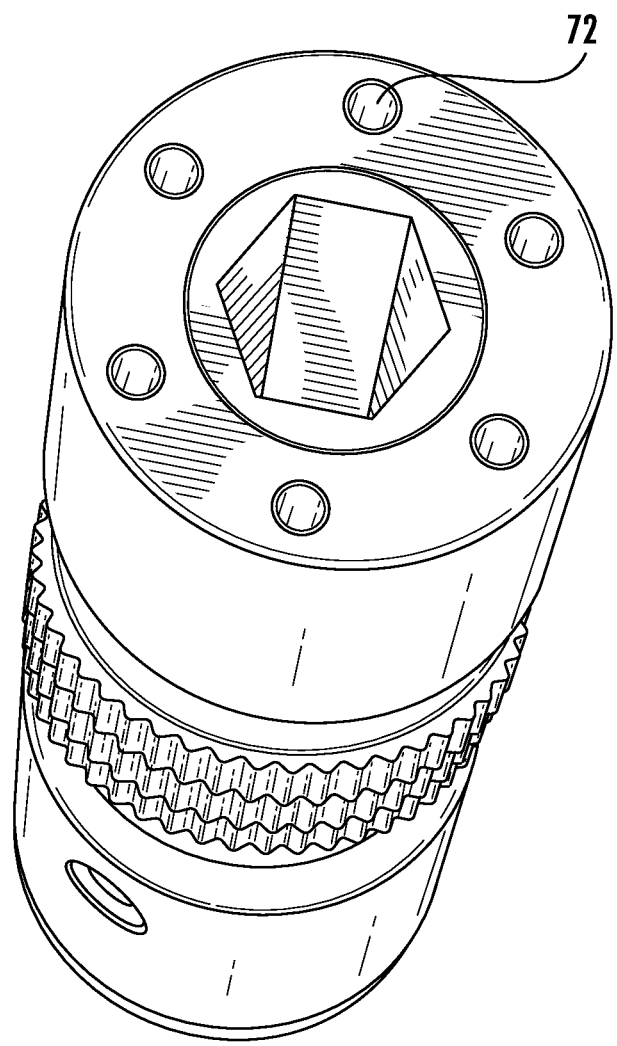
FIG. 5 is a perspective view of a surface of a receiving member that interengages with a releasable member.

As best seen in reference to FIG. 5, a terminal end 26 of receiving member 12 can define a plurality of apertures similar to apertures 72 and 74 described earlier. By providing a plurality of receiving apertures, the receiving member and the releasable member can provide ready engagement between the respective alignment members 152 and 154 carried by flange 148. In another words, any orientation of a multi-sided shaft 142 will bring about a proper alignment of the pair of rotational alignment members 152 and 154 relative to the plurality of receiving apertures 72.

The provision of rotational alignment members with associated alignment apertures is not believed necessary for all applications. However, for structures subjected though a large amount of weight or torsion rotation such as the use of heavy booms arms, it is believed that the additional locking mechanism between the pins and apertures provides an even greater degree of vibration and vibration dampening or transmittal through the quick release connector.

Figure 6:
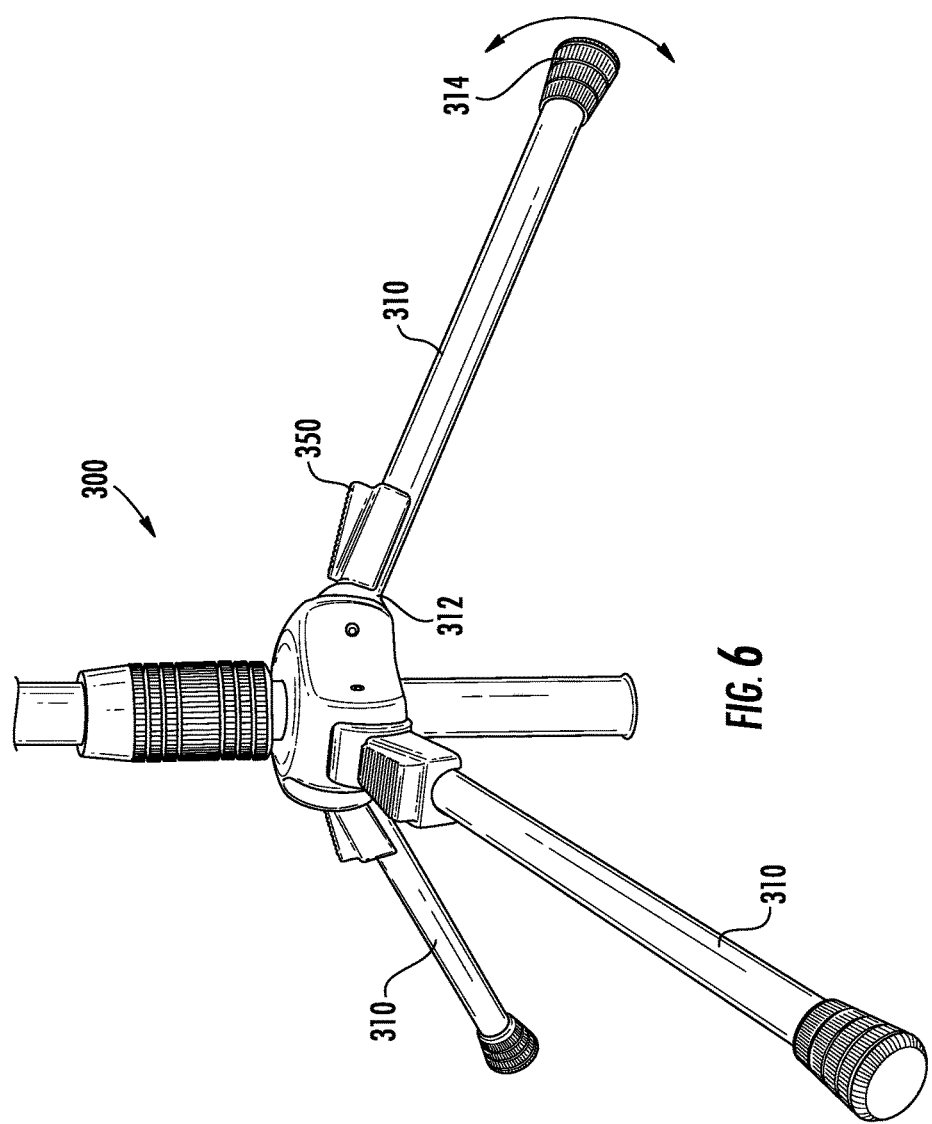
FIG. 6 is a perspective view of a music stand having independently adjustable legs.

Another aspect of the present invention is directed to a stand particularly useful as a stand for holding microphones, music stand accessories and cameras. As such, the music stand is useful to use with the quick release connector 10 described herein. As best seen in reference to FIG. 6, a music stand 300 may be in the form of a tripod structure having a plurality of three legs 310. Each of the legs 310 defines a first end 312 and a second end 314. As been seen in reference to FIGS. 8-11, a slot 316 is defined through an upper surface of leg 310, slot 316 providing communication between an upper and lower surface of a hollow portion of leg 310. As seen in reference to and exploded view of FIG. 11, the first end 312 of leg 310 defines a housing 318. The interior of housing of 318 is adapted for receiving a pawl 322 carried by a rod 320. Rod 320 is housed within an interior of the hollow leg and further defines a pair of apertures 324 and 324'. As seen in reference to FIG. 9, aperture 324 and 324' can be used with fasteners as illustrated to secure a bottom surface of a release tab 350 to an upper surface of leg 310.

Figure 9:
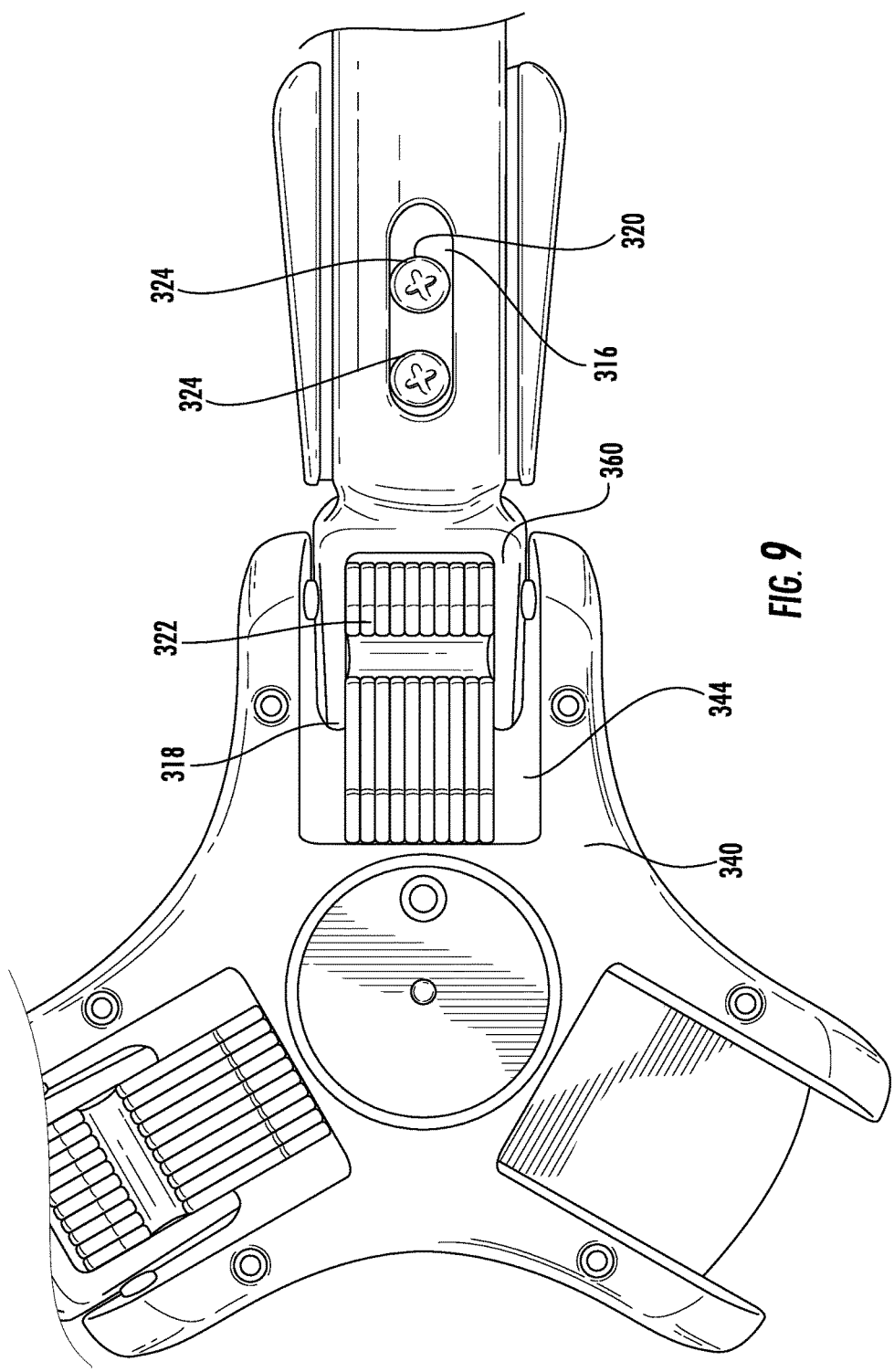
FIG. 9 is a bottom view of the music stand base and having a ratchet and leg secured within a housing of the base.
Figure 10:
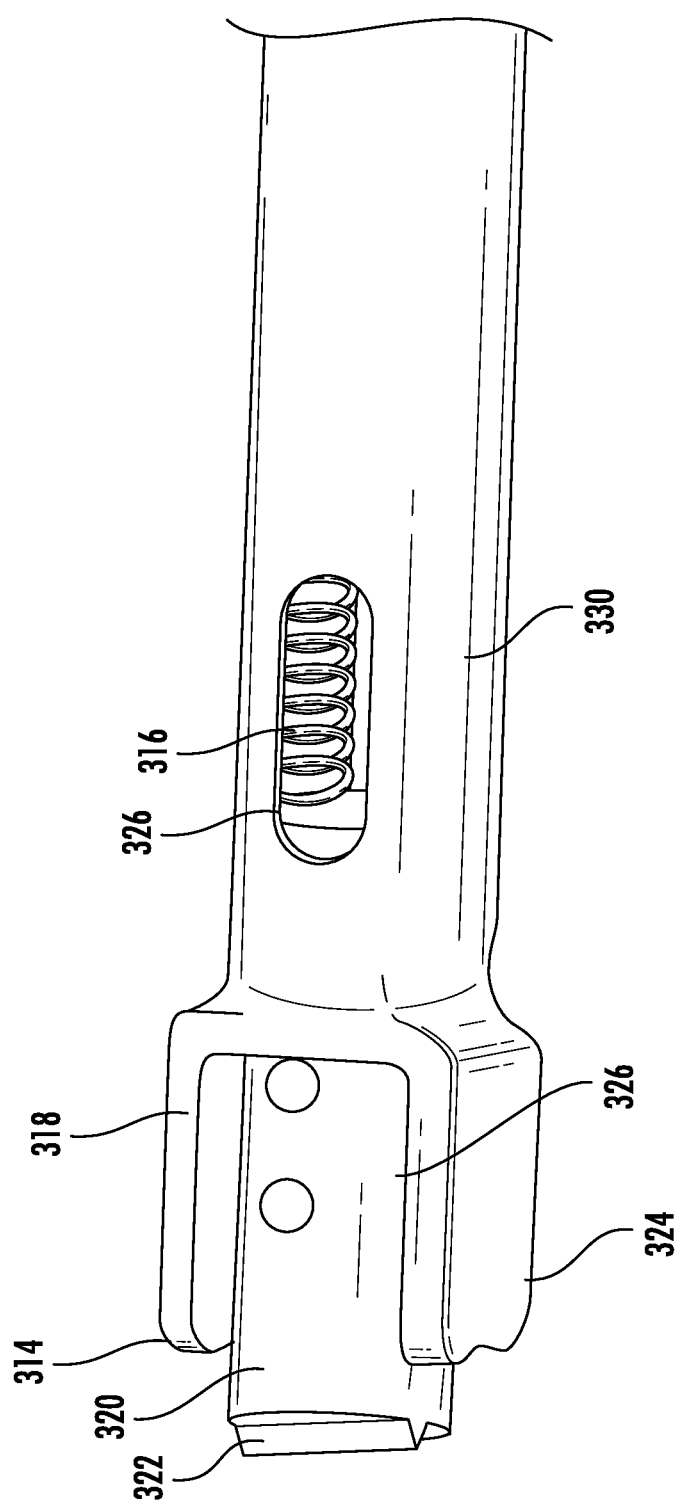
FIG. 10 is a bottom view of a leg showing a partially exploded view of internal components carried by the leg.
Figure 11:
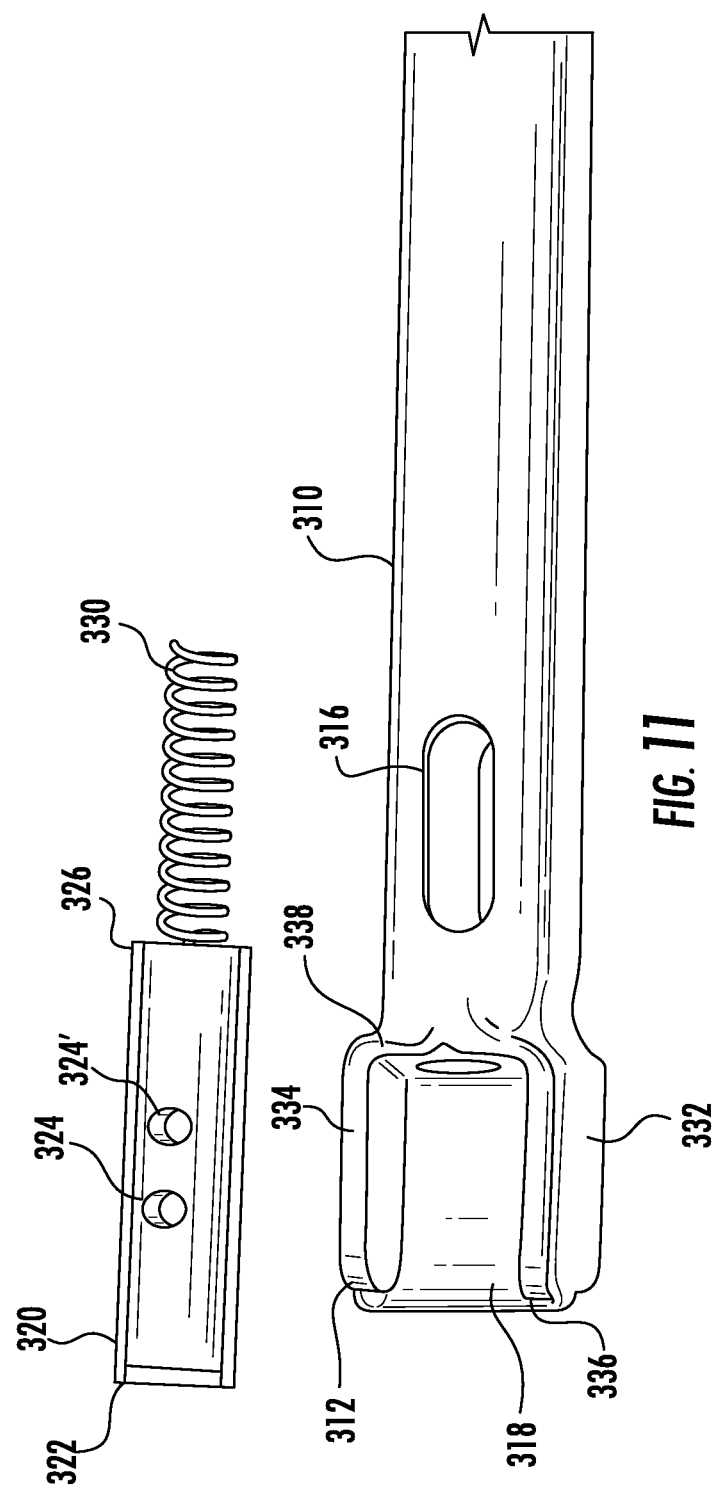
FIG. 11 is an exploded view of the components seen in FIG. 10.

As best seen in reference to FIGS. 10 and 11, rod 320 is insertable within a hollow interior of leg 310. A spring 330 is positioned along a terminal end 326 which when placed within an interior leg 310 and provides a tensioning and biasing force for rod 320. A terminal end of rod 320 defines a pawl 322 which may be in the form of a single tooth pawl and is adapted for interengaging with corresponding teeth 362 defined by a ratchet 360. As best seen in reference to FIGS. 9 and 14, a portion of the ratchet 360 is adapted for engaging the housing 318 of leg 300. The interengagement of the pawl 322 with the ratchet 360 and ratchet teeth 362 allows for a pivoting movement of the leg 300 relative to a vertical axis of the music stand.

Leg housing 318 is defined by two parallel edge walls 332 and 334, a curved rear wall 336 and bottom wall 338. Bottom wall 338 defines a bore receiving rod 320 therein so as to be in communication with the interior of leg 310. A rear wall 368 of ratchet 360 provides the flat surface for engaging a corresponding wall of base 340, rear wall 368 further defining two opposing edge walls which provide a mechanical stop for limiting movement of housing 318 past a substantially perpendicular or a substantially parallel orientation relative to a vertical axis of the stand.

Ratchet 360 is further adapted for engaging within a base receptacle 344 as best seen in reference to FIG. 9. The base receptacle 344 is defined by adjacent parallel edge walls, a rear wall, and a top wall. Base 340 is adapted for receiving both a portion of the pawl 322 along with the leg housing 318. Base 340 further defines a pair of opposing apertures 342 and 342' which may be treaded and are used to secure leg housing 318 via aligned apertures 319 and 319' to base 340. As best seen in FIG. 16, ratchet 360 defines a corresponding bore 364 from one side to an opposite side for securement within housing 318 and base 340.

Figure 7:
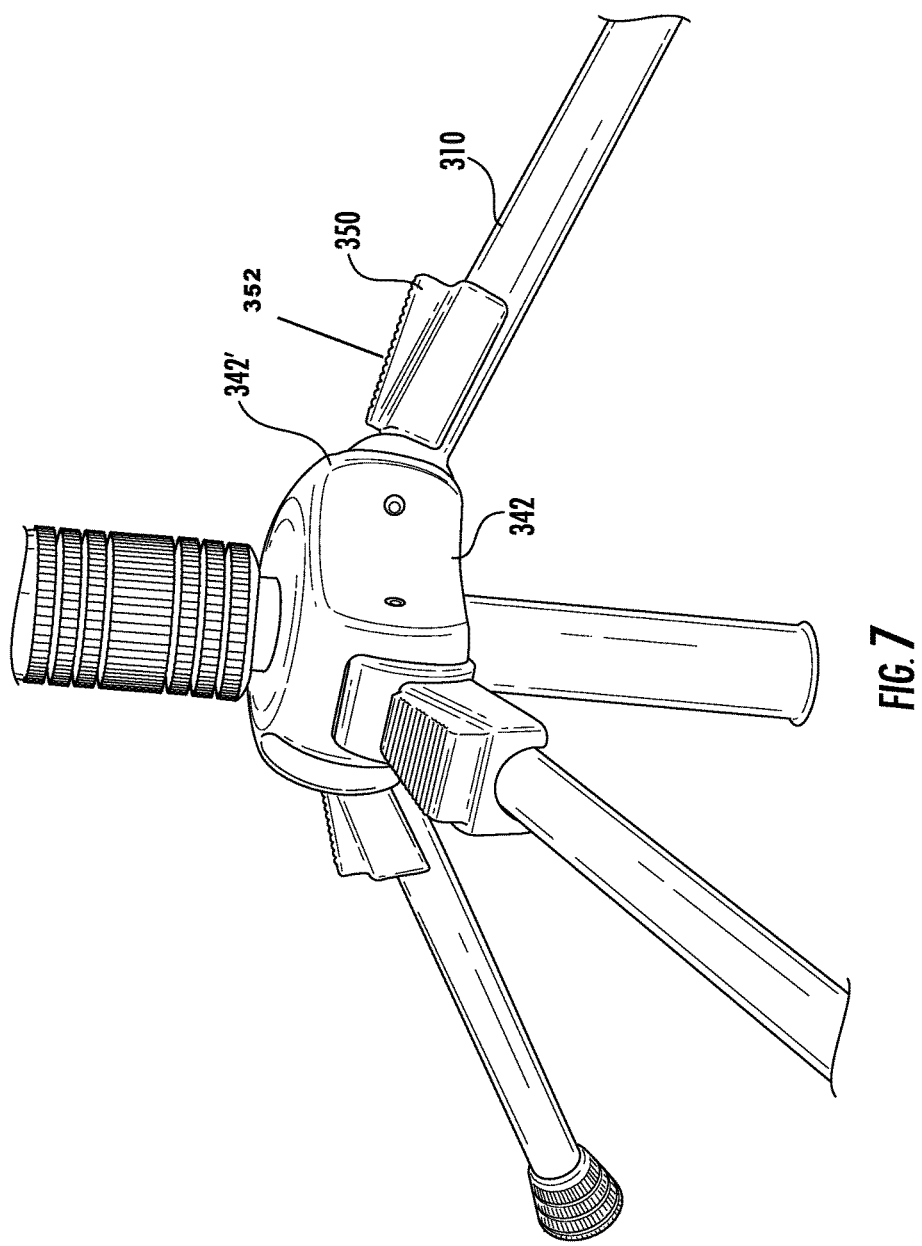
FIG. 7 is a close up perspective view similar as that seen in FIG. 6.
Figure 8:
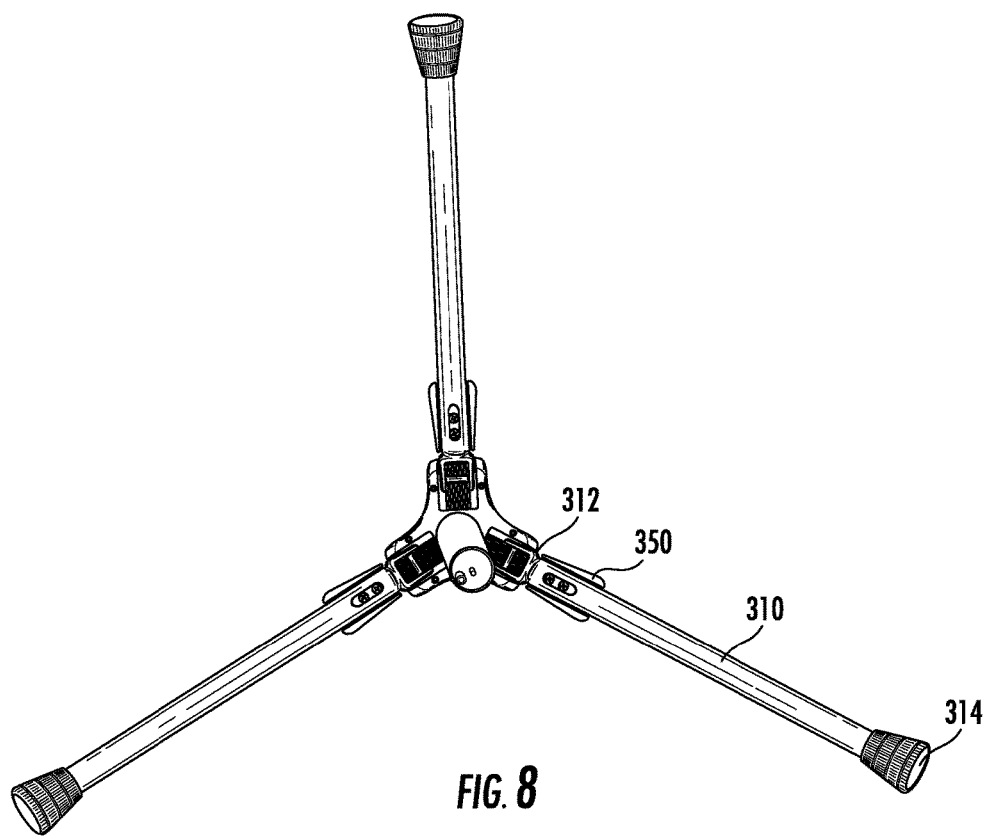
FIG. 8 is a bottom perspective view of a music stand.

As best seen in reference to FIGS. 7, 15 and 16, the release tab 350 has an upper textured surface 352 (FIG. 7) and a lower arcuate surface 346 adapted for a sliding movement along a curved extension surface of the leg 310. Extending from lower surface 354 is an attachment plate 356 configured to fit within the dimensions of slot 316 and defining a pair of apertures 358 therein in used to secure release tab 350 by fasteners inserted through rod apertures 324 and 324'.

The interaction between the ratchet 360 and the pawl 322 allows leg 310 to be freely pivoted in a downward direction. By sliding the release tab 350 in a direction of leg end 314, the release tab 350 moves rod 320 in a similar direction, compressing spring 330. The movement of rod 320 releases pawl 322 from the ratchet 362 teeth defined by ratchet 360. This allows the movement of leg 310, leg 310 now free to pivot along a connector extending through leg housing 318 and apertures 319 and 319', ratchet 360, and secured through the aligned apertures 342 and 342' defined by base 340. When the releasing tab 350 is disengaged, spring 330 provides a tensioning force which moves rod 320 and pawl 322 into an engagement position within ratchet 360 and ratchet teeth 362. The engagement prevents further movement of the leg in an upward direction.

The advantages of the leg configuration for the music stand is such that a user can adjust a position of a microphone, relative to the user, by bringing the microphone forward, backward, or to a left or a right of the user. By engaging and moving only one leg, the relative position of the microphone or other equipment carried on the end of the stand can be varied. Such an ability to fine tune a position of the music stand and any accompanying microphone is much quicker and far less cumbersome than manual adjustments to the microphone. Such an ability to fine tune a position of the music stand and the accompanying microphone is much quicker and far less cumbersome than raising and lowering a vertical telescopic post associated with music stands or repositioning a microphone within the microphone holder. By a simple quick release of the release tab 350 and adjustment to a single leg a user can change the position of the vertical axis of the music stand so as to better position a microphone or other accessory in a desired location.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed:

1. A quick release connector, comprising:
    a receiving member that has a bore that is a through bore that extends in a longitudinal direction from a first terminal end of the receiving member to a second terminal end of the receiving member, wherein a first slot extends in the longitudinal direction and is defined through a portion of the receiving member from an exterior surface of the receiving member to the bore of the receiving member, wherein the receiving member has a step on the exterior surface;
    an engagement member attached to the receiving member such that the engagement member and the receiving member do not move relative to one another, wherein the engagement member has an inner surface that has an inclined portion;
    a slide member that moves in the longitudinal direction relative to the receiving member and the engagement member, wherein the slide member has a bore that is a throughbore that extends in the longitudinal direction from a first terminal end of the slide member to a second terminal end of the slide member, wherein aperture is defined through a portion of the slide member from an exterior surface of the slide member to the bore of the slide member, wherein the slide member has a step on an interior surface of the slide member;
    a first ball located in both the slot and the first aperture, wherein the first ball engages the inclined portion of the engagement member;
    a spring that engages the step of the receiving member and the step of the slide member; and
    a releasable member that has a shaft that is at least partially located within the bore of the receiving member when the shaft is attached to the receiving member, wherein when the shaft is attached to the receiving member when the ball engages the shaft, the releasable member having a flange that defines two rotational alignment members wherein the two rotational alignment members each engage one of the two rotational alignment apertures when the portion of the releasable member is in the bore of the engagement member when the slide member is in the attached position such that the location of the releasable member relative to the engagement member is fixed; and wherein the releasable member has external threading that is adapted for engaging a component of a microphone.

2. The quick release connector as set forth in claim 1, wherein the bore of the receiving member from the second terminal end of the receiving member to a location between the first and second terminal ends of the receiving member in the longitudinal direction has a hexagonal cross-sectional shape, wherein the shaft of the releasable member has a hexagonal cross-sectional shape such that six planar surfaces make up an exterior surface of the shaft, wherein the six planar surfaces of the shaft are all flat and lack depressions thereon.

3. The quick release connector as set forth in claim 1, further comprising a pin located within the receiving member, wherein a wobble projection s located at a terminal end of the pin wherein the longitudinal axis of the receiving member extends through the wobble projection wherein the shaft of the releasable member has a terminal end and defines a wobble projection aperture wherein the wobble projection is located in the wobble projection aperture when the shaft is attached to the receiving member.

4. The quick release connector as set forth in claim 1, wherein the engagement member has a plurality of rotational alignment members that extend from the face in the longitudinal direction, when a dampener extends from one of the rotational alignment members to the other one of the rotational alignment members;

wherein the releasable member has a flange that defines a plurality of rotational alignment member receiving apertures, wherein the plurality of rotational an alignment member receiving apertures each receive one of the plurality of rotational alignment members when the shaft is attached to the receiving member and wherein the releasable member has external threading adapted for engaging a first component of a microphone stand.

5. The quick release connector as set forth in claim 1, wherein the receiving member has a second slot and a third slot that each extend in the longitudinal direction and are defined through the portion of the receiving member from the exterior surface of the receiving member to the bore of the receiving member, wherein the first slot, the second slot, and the third slot are located at different degrees about the longitudinal axis, wherein the receiving member has internal threading that is adapted for engaging component of a microphone stand;
wherein the slide member has a second aperture and a third aperture that are each defined through the portion of the slide member from the exterior surface of the slide member to the bore of the slide member, wherein the first aperture, the second aperture, and the third aperture are located at different degrees about the longitudinal axis;
further comprising:
a second ball located in both the second slot and the second aperture, wherein the second ball engages the inclined portion of the engagement member; and
a third ball located in both the third slot and the third aperture, wherein the third ball engages the inclined portion of the engagement member;
wherein when the shaft is attached to the receiving member the second ball and the third ball engage the shaft.

6. The quick release connector as set forth in claim 1, wherein the portion of the slide member is a tapered portion and directly faces the inclined portion of the inner surface of the engagement member, wherein the slide member has a gripping element on an exterior surface of the slide member.

7. A quick release connector, comprising:
a receiving member that has a longitudinal axis, wherein the receiving member has a bore that extends in a longitudinal direction, wherein the receiving member has a slot that extends in the longitudinal direction and is defined through a portion of the receiving member from an exterior surface of the receiving member to the bore of the receiving member;
an engagement member that does not move relative to the receiving member, wherein the engagement member has an inner surface that has an inclined portion, wherein the ball engages the inclined portion of the inner surface of the engagement member when the slide member is in the attached position, and wherein the ball does not engage the inclined portion of the inner surface of the engagement member when the slide member is in the detached position;
the slide member has a bore that extends in the longitudinal direction, wherein the slide member has an aperture that is defined through a portion of the slide member from an exterior surface of the slide member to the bore of the slide member wherein a portion of the ball is located in the aperture when the slide member is in the attached position;
a slide member that moves relative to the receiving member in the longitudinal direction between an attached position and a detached position;
a ball, wherein at least a portion of the ball is located in the bore of the receiving member and in the slot of the receiving member when the slide member is in the attached position, wherein when the slide member is in the detached position no portion of the ball is located in the bore of the receiving member and
a releasable member that is at least partially located in the bore of the receiving member and is engaged by the ball when the slide member is in the attached position, wherein when the slide member is in the detached position the B releasable member is removable from the bore of the receiving member and the releasable member has a flange that defines two rotational alignment members wherein the two rotational alignment members each engage one of the two rotational alignment apertures when the portion of the releasable member is in the bore of the engagement member when the slide member is in the attached position such that the location of the releasable member relative to the engagement member is fixed; and wherein the releasable member has external threading that is adapted for engaging a component of a microphone.

8. The quick release connector as set forth in claim 7, wherein the slide member has a portion that is a tapered portion and directly faces the inclined portion of the inner surface of the engagement member, wherein the slide member has a gripping element on an exterior surface of the slide member, wherein the slide member has a step on an interior surface of the slide member;
wherein the receiving member has a step on the exterior surface of the receiving member;
and further comprising a spring that engages the step of the receiving member and that engages the step of the slide member, wherein the spring is biased such that the biasing force of the spring urges the slide member to the attached position.

9. The quick release connector as set forth in claim 7, further comprising a pin located within the receiving member, wherein the pin has a wobble projection, wherein the longitudinal axis of the receiving member extends through the wobble projection, wherein the releasable member defines a wobble projection aperture, wherein the wobble projection is located in the wobble projection aperture when the releasable member is at least partially located in the bore of the receiving member and engaged by the ball when the slide member is in the actuated position.

10. The quick release connector as set forth in claim 9, wherein the wobble projection is in the shape of a cone.

11. The quick release connector as set forth in claim 7, wherein the releasable member has a flange that defines two rotational alignment member receiving apertures, wherein the two rotational alignment member receiving apertures each receive one of the two rotational alignment members when the releasable member is at least partially located in the bore of the receiving member and is engaged by the ball when the slide member is in the attached position.

12. The quick release connector as set forth in claim 7, wherein the releasable member has external threading that engages a first component of a microphone, and wherein the receiving member has internal threading that engages a second component of a microphone stand.

13. The quick release connector as set forth in claim 7, wherein the receiving member has a second slot and a third slot that each extend in the longitudinal direction and are defined through the portion of the receiving member from the exterior surface of the receiving member to the bore of the receiving member, wherein the first slot, the second slot, and the third slot are located at different degrees about the longitudinal axis;
   wherein the slide member has a bore that extends in the longitudinal direction, wherein the slide member has a first aperture, a second aperture and a third aperture that are defined through a portion of the slide member from an exterior surface of the slide member to the bore of the slide member, wherein the first aperture, the second aperture, and the third aperture are located at different degrees about the longitudinal axis;
   wherein the ball is located in the first aperture and the first slot when the slide member is in the attached position; further comprising:
   a second ball located in both the second slot and the second aperture when the slide member is in the attached position; and
   a third ball located in both the third slot and the third aperture when the slide member is in the attached position;
   wherein when the releasable member is at least partially located in the bore of the receiving member and the slide member is in the attached position the second ball and the third ball engage the releasable member.

14. A quick release connector, comprising:
   an engagement member that has a bore, wherein the engagement member has an inner surface that has an inclined portion;
   a slide member that moves relative to the engagement member between an attached position and a detached position, wherein a portion of the slide member is located in the bore of the engagement member when the slide member is in the attached position; and
   a releasable member whose location relative to the engagement member is fixed when the slide member is in the attached position, wherein when the slide member is in the detached position the releasable member is movable relative to the engagement member, wherein a portion of the releasable member is in the bore of the engagement member when the slide member is in the attached position, and the releasable member further having a flange that defines two rotational alignment members wherein the two rotational alignment members each engage one of the two rotational alignment apertures when the portion of the releasable member is in the bore of the engagement member when the slide member is in the attached position such that the location of the releasable member relative to the engagement member is fixed; and wherein the releasable member has external threading that is adapted for engaging a component of a microphone.

15. The quick release connector as set forth in claim 14, further comprising a ball that engages the inclined portion of the inner surface of the engagement member and that engages the releasable member when the slide member is in the attached position.

16. The quick release connector as set forth in claim 15, further comprising a receiving member that has a longitudinal axis, wherein the receiving member has a bore that extends in a longitudinal direction, wherein the receiving member has a slot that extends in the longitudinal direction and is defined through a portion of the receiving member from an exterior surface of the receiving member to the bore of the receiving member;
   wherein the slide member has a bore that extends in the longitudinal direction wherein the slide member has an aperture that is defined through a portion of the slide member from an exterior surface of the slide member to the bore of the slide member, wherein the slide member has a portion that is a tapered portion and directly faces the inclined portion of the inner surface of the engagement member, wherein the slide member has a gripping element on an exterior surface of the slide member;
   wherein the ball is located in the slot of the receiving member and is located in the aperture of the slide member when the ball engages the inclined portion of the inner surface of the engagement member and engages the releasable member when the slide member is in the attached position.

17. The quick release connector as set forth in claim 14, further comprising a pin that has a wobble projection, wherein the wobble projection is in the shape of a cone, wherein the releasable member defines a wobble projection aperture, wherein the wobble projection is located in the wobble projection aperture when the portion of the releasable member is in the bore of the engagement member when the slide member is in the attached position such that the location of the releasable member relative to the engagement member is fixed.

* * * * *